Nov. 4, 1958 G. R. P. MARIÉ 2,859,412
MODE TRANSFORMING WAVE GUIDE TRANSITION
Filed Nov. 2, 1956 3 Sheets-Sheet 1

United States Patent Office 2,859,412
Patented Nov. 4, 1958

2,859,412

MODE TRANSFORMING WAVE GUIDE TRANSITION

Georges Robert Pierre Marié, Paris, France

Application November 2, 1956, Serial No. 620,029

Claims priority, application France December 31, 1955

3 Claims. (Cl. 333—21)

The present invention relates to transition members for connecting rectangular waveguides, in which waves are propagated in accordance with the $TE_{01}$ mode, to circular waveguides in which the wave is propagated in the $TE_{01}$ mode.

The wave is converted by modifying the shape of the cross sections of the transition member in such a manner that the lines of the electric field, which are straight lines parallel to the small side of the rectangular waveguide become concentric circumferences in the circular waveguide.

Numerous types of transition are already known for the purpose of transforming a $TE_{01}$ wave in a rectangular guide into a $TE_{01}$ wave in a circular guide and vice versa. In this connection, mention may be made of the two transitions described by Dicke and Purcell in the book "Principles of Microwave Circuits" (Massachusetts Institute of Technology—Radiation Laboratory Series—1948 edition, chapter 10, Fig. 10–6(b) page 339 and Fig. 10–7, page 340).

One of these transitions (Fig. 10–6(b) of this book) transforms a $TE_{01}$ wave mode of a rectangular guide into a $TE_{02}$ wave mode, likewise in a rectangular guide. The other transition (Fig. 10–7 of this book) converts the $TE_{02}$ wave mode in a rectangular guide into a $TE_{01}$ mode in a circular guide.

It is feasible to place these two transitions end to end in order to obtain a transition giving the same results as that about to be described in the present application. However, the transitions mentioned above are critical in construction. That shown in the above mentioned figure (10–6) of the work cited, in which there is a progressive change in the rectangular cross sections of the guide, and twisting of the guide, obviously requires considerable technical skill in construction.

Attention is also directed to the two transitions described in a book by George Southworth (Bell Telephone Laboratories) entitled "Principles and Applications of Waveguide Transmission" (Van Nostrand, New York, 1950 edition, chapter 9, Fig. 9.6–12, page 362, and Fig. 9.6–13, page 363).

The transition shown in Fig. 9.6–12 of this work consists, like that of Purcell, of two parts successively carrying out the transformations of a $TE_{01}$ wave into a $TE_{02}$ wave in a rectangular guide, and of a $TE_{02}$ wave in a rectangular guide into a $TE_{01}$ wave in a circular guide. For the purpose of transforming $TE_{01}$ waves into $TE_{02}$ waves, the rectangular guide separates into two identical parts having progressively varying cross sections; then the two tubes, having been twisted, one in one direction, and the other in the opposite direction, have at their ends two rectangular sections which are juxtaposed in a common plane by bringing their small sides into contact.

Great care is required in the construction of such a transition, since it is essential to obtain two tubes of the same electrical length. If this is not the case, the electrical fields are not exactly in opposite phase with one another in the straight end sections of the transition, the result being an appreciable loss of electromagnetic energy.

This loss of energy must be avoided, since the transformation of a $TE_{01}$ wave of a rectangular guide to a $TE_{01}$ wave of a circular guide is generally used chiefly for the purpose of transmitting electromagnetic energy over a distance with as little attenuation as possible.

The transition to which the invention relates is easier to construct than those mentioned above. It does not comprise any helical surfaces. It consists solely of planes forming a polyhedron connected to a cylinder.

A transition, in accordance with a preferred embodiment of the invention, comprises three parts, namely:

(a) A first part transforming the $TE_{01}$ wave of the rectangular input waveguide into a $TE_{02}$ wave, likewise in a rectangular guide.

(b) A second part transforming the $TE_{02}$ wave system into a special wave system comprising a repetition axis of the fourth order, and being propagated in a wave guide of which the straight section is in the shape of a cross having four branches of equal length.

(c) A third part transforming the waves in the cross-shaped guide into a $TE_{01}$ wave propagated in the circular guide connected to the end of the transition.

The invention will be better understood with reference to the following detailed description and to the attached drawings, wherein.

Figure 2:
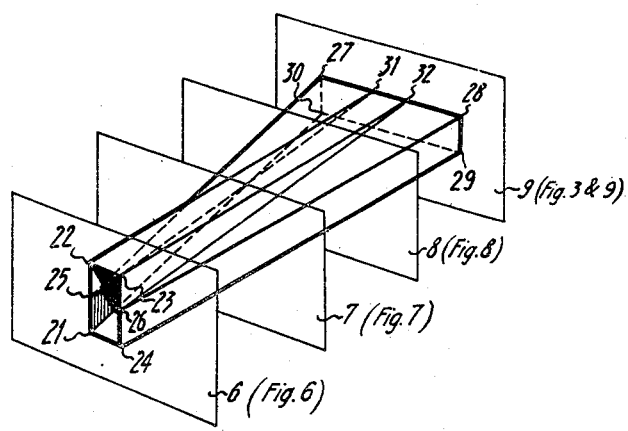
Fig. 2 shows the first part of the transition which transforms the $TE_{01}$ wave into a $TE_{02}$ wave in a rectangular guide.
Figure 3:
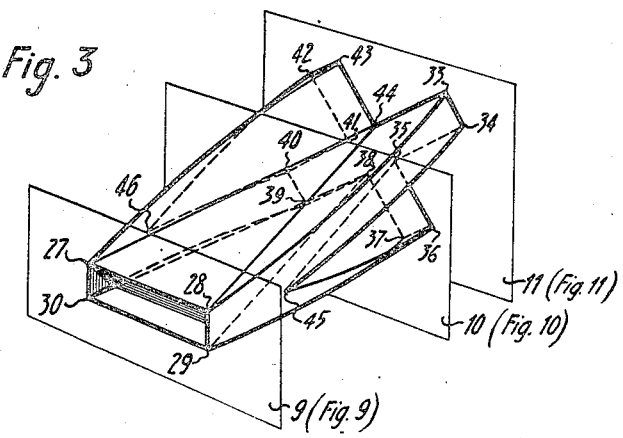
Figure 4:
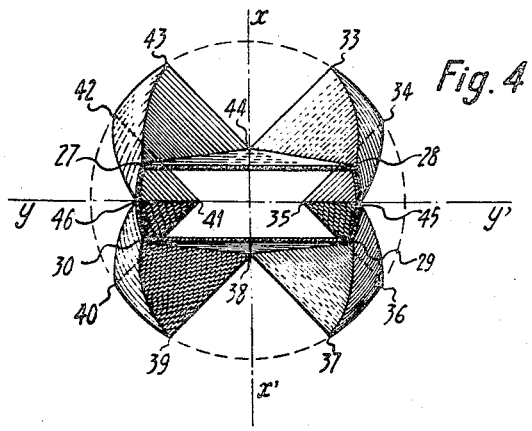
Figure 5:
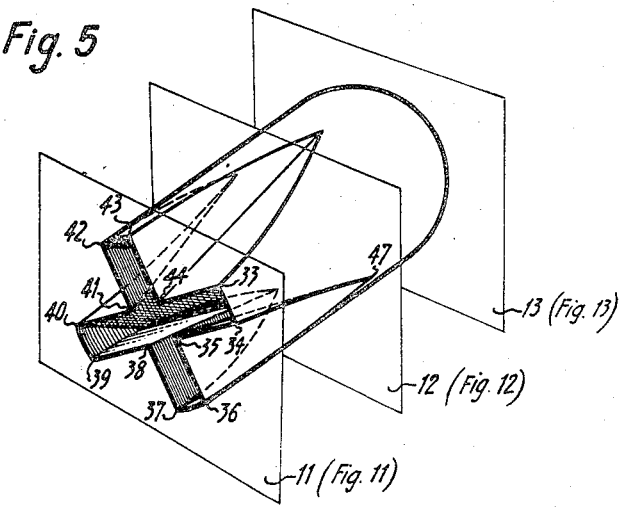
Figure 7:
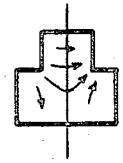
Figure 8:
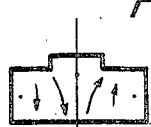
Figure 9:
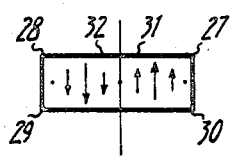
Figure 10:
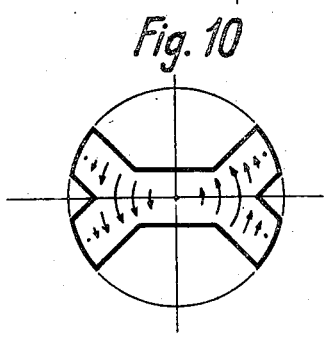
Figure 11:
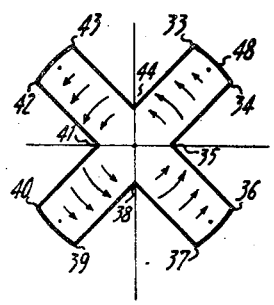
Figure 12:
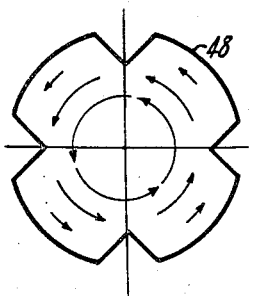
Figure 13:
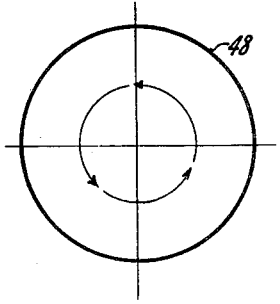
Figure 14:
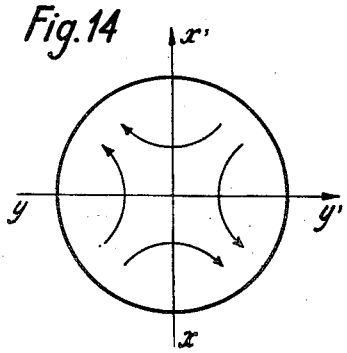
Figure 15:
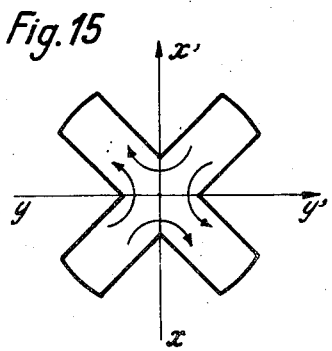

Fig. 3 relates to the second part of the transition, which transforms the $TE_{02}$ wave into a wave system having a fourth-order repetition axis;

Fig. 4 is an end view on the rectangular guide side of the part of the transition illustrated in Fig. 3;

Fig. 5 relates to the third part of the transition, progressively transforming the cross-shaped waveguide into a circular waveguide;

Figs. 6, 7, 8 and 9 are diagrams of electric fields relating to cross sections in the first part of the transition shown in Fig. 2, the diagram in Fig. 9 being in the plane of the junction between the first and second parts;

Figs. 10 and 11 show the field diagrams in cross sections of the part of the transition shown in Fig. 3, the diagram in Fig. 11 being in the plane of the junction between the second and third parts;

Figs. 12 and 13 relate to the electric fields in cross sections of the part of the transition shown in Fig. 5;

Figs. 14 and 15 relate to the electric fields of wave systems capable of being set up in the transition if certain precautions are not taken.

Figure 1:
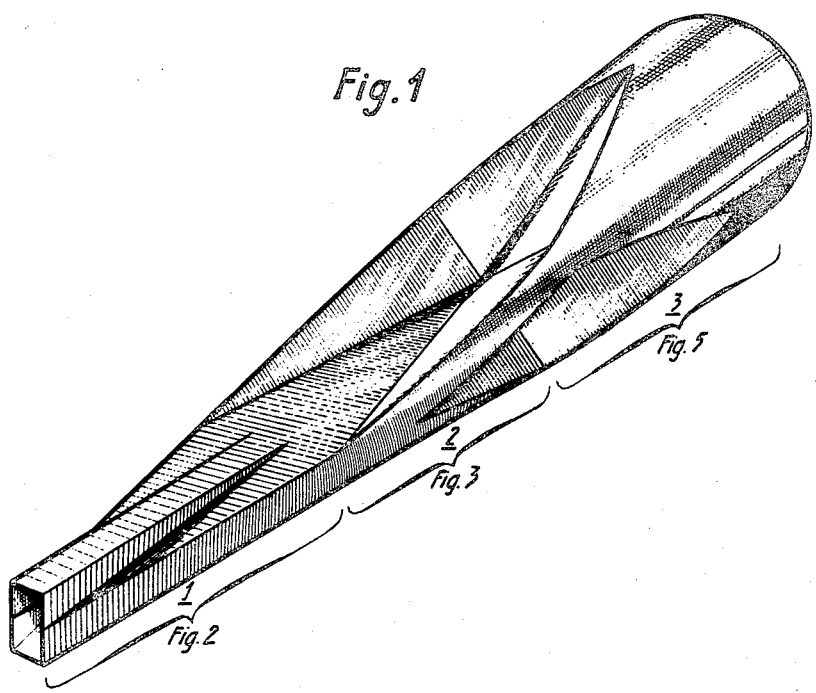
Fig. 1 shows a perspective view of the transition according to the invention.

Fig. 1 clearly shows the three parts 1, 2 and 3 shown in more detail in Figs. 2, 3 and 5.

In Fig. 2, the $TE_{01}$ wave enters the transition via the cross section 21, 22, 23, 24 comprised in the plane 6. The points 25 and 26 of this section are the mid-points of the large sides of the guide.

The $TE_{02}$ wave leaves the partial transition via the cross section 27, 28, 29, 30 situated in the plane 9.

The points 21, 24, 29, 30 are situated in a common plane perpendicular to the planes 6 and 9. In the same way, the points 25, 26, 27, 28, are in a plane parallel to the plane of the points 21, 24, 29, 30.

The whole of this part of the transition has a plane of symmetry passing through the mid-points of the sides 21—24, 22—23, 27—28, and 29—30.

The points 31 and 32 are two points on the side 27—28 situated on either side of this plane of symmetry, in such a manner that the edges 22—31 and 23—32 are two parallel straight lines perpendicular to the side 27—28.

This part of the transition (Fig. 2) is thus bounded solely by rectangles, triangles and trapezia.

Figure 6:
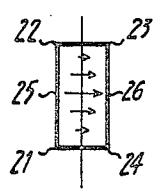

Fig. 6 shows the aspect of the field in the cross section in the plane 6; the field lines are straight lines perpendicular to the large sides of the guide 21—22 and 23—24.

Fig. 7 is the diagram of the field in the cross section in the plane 7. The field lines in the broadened part of the guide are in one direction to the left of the plane of symmetry of the transition, and in the opposite direction to the right of this same plane of symmetry.

In Fig. 8, which shows the field in the cross section in the plane 8, the field is more noticeably divided into two parts; this division is completely achieved in the cross section in Fig. 9. This figure shows that the field lines are perpendicular to the large sides 27—28 and 29—30, and furthermore that the lines are directed from top to bottom of the section on the left-hand side of the field, and are oppositely directed on the right-hand side. The $TE_{02}$ wave system is thus achieved in this manner. It will also be noted that the plane of symmetry of this partial transition (Fig. 2) is a plane of anti-symmetry both for the incoming $TE_{01}$ waves and for the outgoing $TE_{02}$ waves.

Reference will be made in some cases to Fig. 3 and in some cases to Fig. 4 for the purpose of describing the second part of the transition, these two figures being complementary to one another.

The cross having four equal branches of which the apices are designated by 33, 34, 35, 36, 37, 38, 39, 40, 41, 42, 43, 44 forms the output of the second partial transition. The geometrical construction is as follows:

The point 45 is selected on the perpendicular to the mid-point of the small side 28—29, and not far from these points.

A point 46 is taken, in the same manner as the point 45, on the perpendicular to the small side 27—30. The straight line 45—35 is the intersection of the two planes 45—35—34 and 45—35—36 at right angles. The straight line 46—41 is the intersection of the two planes 46—41—42 and 46—41—40 at right angles. This dihedron is symmetrical to the first with respect to the plane of symmetry which is indicated in Fig. 4 by the line x—x'.

The transition furthermore comprises three planes 27—43—44, 27—44—28, and 28—44—33. These planes intersect in pairs, and have a common point 44. Finally, the transition comprises three other planes 30—39—38, 30—38—29, and 38—29—37, symmetrical to the three preceding ones with respect to the plane of symmetry indicated in Fig. 4 by the line y—y'.

The $TE_{02}$ wave is anti-symmetrical with respect to the planes of symmetry x—x' and y—y'; the result of this is that the waves leaving the cross-shaped guide must likewise be anti-symmetrical with respect to these same planes; hence the aspects of the electric fields shown in Figs. 9, 10 and 11 relating to the cross sections of the partial transition (Fig. 3) in the planes 9, 10 and 11.

Examination of the orientation of the field lines in Fig. 11 clearly shows that, by passing progressively from a cross-shaped section to a circular section, it is possible to obtain in this latter section a wave system of which the field lines are concentric circles, i. e. $TE_{01}$ waves.

This transformation is effected through the third partial transition shown in Fig. 5. It will be seen that the latter is produced by cutting away the cylindrical guide in accordance with four dihedrons such as that formed by the planes 35—34—47 and 36—35—47, which intersect the plane of the cross along its large sides at right angles.

Figs. 11, 12 and 13 relate to the cross sections in the planes 11, 12 and 13 (Fig. 5), and show how the cutaways mentioned above broaden the arms of the cross while preserving the circle 48 which externally bounds the said cross.

Examination may now be made of the undesirable wave systems which can be set up in the transition to which the invention relates.

Waves of the $TE_{12}$ type can become superimposed on the $TE_{01}$ wave. The field lines relating to these $TE_{12}$ waves are shown in Fig. 14. The $TE_{12}$ waves are also antisymmetrical with respect to x—x' and y—y'. In practice, they can only be set up by waves occurring in the cross-shaped part of the device and having the structure shown in Fig. 15. They can be prevented by reducing the thickness of the arms of the cross-shaped part to a value less than half the wave-length (in free space) of the waves propagated in this part. Provided this precaution is taken, the transition according to the invention gives very pure $TE_{01}$ waves.

In conclusion, a few details will be given of the method of constructing this transition. It is in fact possible to build a mandrel having the shape of the transition with the help of straight milled cuts in a square bar or a frustrum of an aluminium cone. The mandrel is then covered by a sufficiently thick layer of electrolytic copper. The transition can then be produced by dissolving the aluminium of the mandrel with the aid of suitable acids. This is the well known so-called "Electroforming" process.

It may be mentioned that the re-entrant angles of the mandrel can be rounded off without departing from the scope of the invention. This facilitates the electroforming process without modifying the electric field diagrams in the various cross sections of the transition. These rounded-off portions can be automatically produced with milling cutters likewise having rounded-off angles (so-called filleted milling cutters).

What is claimed is:

1. In a transition device for guided waves connecting a rectangular input wave guide in which a wave is propagated in accordance with the $TE_{01}$ mode to a cylindrical circular output wave guide in which a wave is propagated in accordance with the $TE_{01}$ mode of said circular guide, a partial transition member transforming the $TE_{01}$ wave of said input guide into a $TE_{02}$ wave in a rectangular intermediate guide consisting of a guide length with a T-shaped cross-section progressively changing from the rectangular cross-section of said input guide to the rectangular cross-section of said intermediate guide.

2. A transition member as claimed in claim 1, wherein the cross-sections of said input and intermediate guides have their respective smaller sides mutually perpendicular and their planes parallel, and wherein the outer lateral surface of said transition member is composed of four rectangular and four triangular plane surfaces.

3. In a transition device of the class described and comprising a transition member as claimed in claim 1, a further transition member the cross-section of which progressively changes from the rectangular cross-section of said intermediate guide to a cross-shaped cross-section, wherein the outer lateral surface of said further transition member is composed of curved portions of a circular cylindrical surface and of ten plane surfaces, two of which are triangular and eight of which have two straight sides and a curved third side consisting of the section of said circular cylindrical surface by the respective planes of said eight plane surfaces.

References Cited in the file of this patent

UNITED STATES PATENTS 2,439,285    Clapp _____ Apr. 6, 1948
2,656,513    King _____ Oct. 20, 1953